United States Patent [19]

Randall

[11] 4,126,957
[45] Nov. 28, 1978

[54] DISPLACEABLE FISHHOOK

[76] Inventor: Richard R. Randall, 3514 Quebec St. NW., Washington, D.C. 20016

[21] Appl. No.: 823,420

[22] Filed: Aug. 10, 1977

[51] Int. Cl.² .............................................. A01K 83/00
[52] U.S. Cl. .................................................. 43/43.16
[58] Field of Search .......................... 43/5, 43.16, 53.5

[56] References Cited

U.S. PATENT DOCUMENTS

| 2,501,210 | 3/1950 | Cretin | 43/43.16 |
| 2,719,380 | 10/1955 | Place | 43/43.16 X |
| 2,984,041 | 5/1961 | Banker | 43/43.16 |
| 3,624,690 | 11/1971 | Ashley | 43/43.16 |
| 3,827,174 | 8/1974 | Banker | 43/43.16 |

Primary Examiner—James L. Jones, Jr.
Assistant Examiner—James G. Smith
Attorney, Agent, or Firm—Emory L. Groff, Jr.

[57] ABSTRACT

A fishhook includes a rigid shank having an articulated hook portion comprising a plurality of pivotally connected segments attached thereto with a barb element at the free end of the hook portion. A bore through the shank communicates with bores in the segments and these serve to house a flexible cable having its distal portion affixed in the area adjacent the barb element. When relaxed, the cable allows the hook portion segments to assume an extended position substantially axially aligned with the shank and in this position a space is formed between the juxtaposed faces of the adjacent segments whereby, subsequent tightening or retraction of the cable pivotally displaces the segments upwardly and rearwardly until the juxtaposed faces abut one another to form a rigid curved hook portion. The barb element may be rigid with respect to the forwardmost segment or alternatively may comprise a displaceable element pivotally attached to the segment and likewise operable upon relaxation and retraction of the cable.

9 Claims, 6 Drawing Figures

DISPLACEABLE FISHHOOK

This invention relates generally to fishhooks and more particularly to an improved fishhook wherein an articulated hook portion is displaceable from a normally curved rigid use position to an alternate position substantially aligned with the shank of the fish hook.

By the present arrangement an improved fishhook is presented which includes a hook portion including a plurality of individual segments sequentially pivoted to one another to produce an articulated section and which is displaced from an extended baiting or disengaging position wherein the articulated section is substantially aligned with an attached rigid shank, to a use position wherein the plurality of segments are drawn upwardly and rearwardly into a rigid curved configuration upon the tensioning of a cable extending through the interior of the shank and all of the pivoted segments and which is anchored adjacent the forwardmost one of the pivoted segments. The advantages of a fishhook having a displaceable hook portion should be obvious to those skilled in the art. Displacement of the hook portion from the curved to the aligned mode not only facilitates disengagement of the fishhook from a particular catch but also facilitates the baiting of the hook when any type of bait is intended to be strung upon the hook, such as chunks of meat or fish or entire small fish.

Numerous prior art examples of fishhooks having a pivotally and/or slideably displaceable hook portion are known such as shown in the patents to Cretin U.S. Pat. No. 2,501,210 issued Mar. 21, 1950, Banker U.S. Pat. No. 2,984,041 issued May 16, 1961, Cox U.S. Pat. No. 3,399,482 issued Sept. 3, 1968, Ashley U.S. Pat. No. 3,624,690 issued Nov. 30, 1971, and Banker No. U.S. Pat. No. 3,827,174 issued Aug. 6, 1974. The instant fishhook offers a decided advantage over the structure illustrated in the above preferred patents by the provision of a hook portion comprising a plurality of substantially similarly constructed elongated segments with the endmost one including a barb and wherein the plurality of pivotally interconnected segments are selectively displaced from a rigid curved configuration to an axially aligned, relaxed disposition, by the selective axial displacement of a tension member passing through a rigid shank and each one of the articulated hook portion segments. Upon the retraction of the tension member the endmost one of the segments is initially drawn upwardly and rearwardly within the limit defined by the space or clearance between its rear edge and the front edge of the next adjacent segment and upon continuing the tension upon the cable the remaining segments are similarly and sequentially upwardly and rearwardly displaced until the free space previously existing between all of the segments has been eliminated as the juxtaposed segment edges abut one another.

Accordingly, one of the objects of the present invention is to provide an improved fishhook including a rigid shank joined to an articulated hook portion adjustable from a rigid curved use position to a relaxed make-ready position wherein the articulated section is substantially axially aligned with the fishhook shank.

Another object of the present invention is to provide an improved fishhook including a curved hook portion comprising a plurality of elongated segments pivotally connected to one another and retained in the curved rigid use position by means of a flexible tension cable passing through all of the segments and having its ends respectively connected to the forwardmost one of the segments and to the free end of the fishhook shank.

A further object of the present invention is to provide an improved fishhook including a rigid shank joined to an articulated hook portion including a plurality of elongated pivotally connected segments angularly displaceable by means of a tension cable passing therethrough and including a barb element affixed to the endmost one of the segments.

Still another object of the present invention is to provide an improved fishhook including a curved hook portion affixed to a rigid shank member and having a displaceable barb element pivotally attached to the free end of the hook portion and which is displaceable from a position extending forwardly beyond the end of the hook portion wherein the barb element may serve as a baiting guide or needle, to a position disposed rearwardly of the point of the hook element to assume a use position, and wherein the displacement of the barb element is achieved by means of a flexible cable affixed to the barb element and passing through the hook portion.

With these and other objects in view which will more readily appear as the nature of the invention is better understood, the invention consists in the novel construction, nature and arrangement of parts hereinafter more fully described, illustrated and claimed.

Similar reference characters designate corresponding parts throughout the several figures of the drawing.

Figure 1:
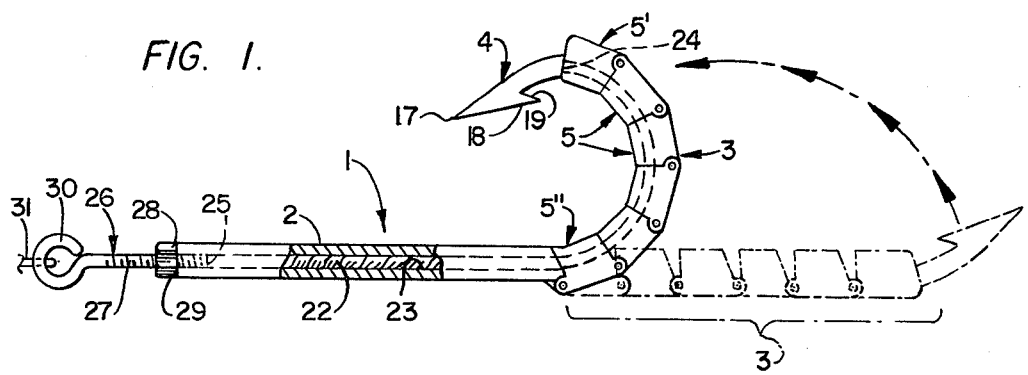
FIG. 1 is a side elevation of a fishhook according to the present invention and illustrates in broken lines the alternate make-ready position of the hook portion.

Refering now to the drawing, particularly FIG. 1, the present invention will be seen to comprise a fishhook generally designated 1, including a relatively fixed shank member 2 joined to a hook portion 3 terminating in the barb element 4. The alternate displaced positions of the hook portion 3 are possible due to the articulated construction provided by the plurality of elongated segments 5 forming the hook portion 3. As shown most clearly in FIGS. 2 and 3 of the drawing each segment 5 includes a main upper body 6 comprising a top wall 7 joined to a bottom wall 8 and defining a longitudinal passageway or bore 9 therebetween. Depending from the forward and rearward portion of each bottom wall 8 respectively, is a head pivot section 10 and a tail pivot section 11 with each provided with a transverse bore 12. Adjacent head pivot sections 10—10 of each segment 5 are laterally offset with respect to the juxtaposed adjacent tail pivot sections 11—11 of the next adjacent pivot section 5 as shown most clearly in FIG. 3 of the drawing to permit mating engagement between the respective pivot sections 10 and 11 and subsequent pivotal connection thereof by means of a suitable transverse pin 13. The plurality of elongated segments 5 may be constructed with alternate segments having both head and tail pivot sections axially aligned with one another as shown in the drawing or alternatively, the head pivot sections 10—10 of each segment 5 may be disposed in an outboard relative the segment bottom wall 8 while the tail pivot sections 11—11 of each segment 5 are disposed in an inboard postion relative to segment bottom wall 8. The important point to remember is that each segment includes integral means below the main body 6 and adjacent the head and tail area to permit pivotal attachment to the next adjacent segment 5.

Figure 2:
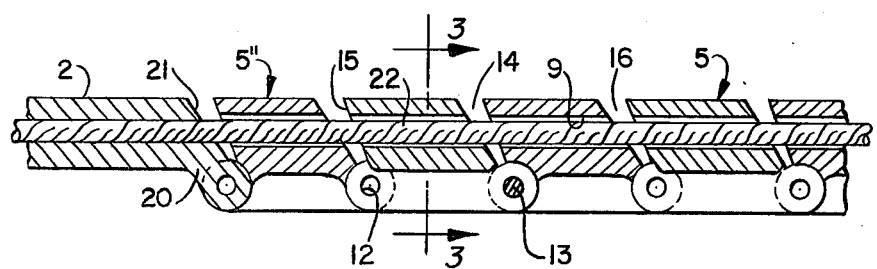
FIG. 2 is a partially enlarged longitudinal cross sectional view of the shank and hook portion of the present invention when in the relaxed or make-ready position.
Figure 3:
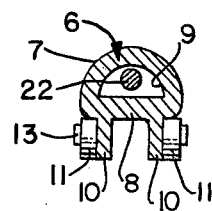
FIG. 3 is a transverse sectional view taken along the line 3–3 of FIG. 2.

When the articulated hook portion 3 is in the relaxed, make-ready position as shown in FIG. 2 of the drawing, it will be seen that the front edge 14 and rear edge 15 of any two adjacent segments 5 are noticeably spaced apart from one another a distance sufficient to provide a substantial space or clearance 16 therebetween. A plane bisecting the spaces 16 formed when the segments 5 are axially aligned as in FIG. 2 will be understood to pass substantially through the axis of the pins 13 therebeneath and although spaced apart segment edges 14 and 15 may be substantially parallel to one another when in the make-ready position, it is preferred to form the edges 14 and 15 at a slight inclination such that a small acute angle is formed when the hook portion 3 is in the extended relaxed position for reasons which will become obvious hereinafter.

The rigid barb element 4 is suitably affixed to the front edge 14 of the forwardmost segment 5' and includes a sharpened point 17 at its distal end which extends angularly rearwardly to a shoulder 18 intersecting with the barb undersurface 19. The aforedescribed hook portion 3 and its barb element 4 are secured to the forward end of a suitable substantially rigid shank member 2 such as by employing one of the same pins 13 to connect the tail pivot sections 11 of the rearmost segment 5" to a pivot lug 20 formed adjacent and below the inclined forward edge 21 of the shank member 2.

Without any further structure being implied it will be seen that the hook portion 3 of the fishhook 1 would be completely relaxed and if disposed upon a flat horizontal surface would assume the extended position shown in broken lines in FIG. 1 of the drawing. Means are accordingly provided to enable the user to displace the hook portion 3 from the relaxed, make-ready position wherein the segments 5 are longitudinally aligned, to the use position wherein the articulated hook portion 3 is maintained in a rigid position with the plurality of segments 5 angularly disposed with respect to one another and fixedly retained in the full line position of FIG. 1. The referenced means comprises a flexible tension cable 22 disposed through a bore 23 formed in the shank member 2 and additionally passing through the bores 9 of all of the articulated segments 5 and which is suitably affixed at its distal forwardmost end in the area of the base of the barb element 4 as at 24 in the drawing. The opposite or rear end of the cable 22 is suitably attached as at 25 to the forward end of an adjustable tension rod 26 which is disposed within the confines of the shank member bore 23. The tension rod 26 is provided with external threads 27 mating with lock means in the form of one or more nuts 28 adapted to abut the rear end 29 of the shank member 2. The opposite, exposed end of the tension rod 26 may be formed with attaching means such as the eye 30 which serves not only as means for the attachment of a fishing line 31 but also will be seen to facilitate the subsequent manipulation of the tension cable 22.

With the foregoing structure in mind the manner of manipulating the fishhook 1 of the present invention to displace the articulated hook portion 3 from its curved rigid use position to the longitudinally aligned make-ready position may now be described. Assuming that the fishhook is in the position as reflected by the broken lines of FIG. 1 of the drawing it will be understood that upon displacement of the nut 28 relative the tension rod threads 27 so as to advance the nut in a direction away from the eye 30, the tension cable 22 and its attachment point 25 will be moved rearwardly toward the end 29 of the shank member 2 with a corresponding axial displacement of the entire length of the cable 22 and since its forward end is fixed at 24 to the forwardmost articulated 5' it will follow that all of the segments 5 will be drawn upwardly and rearwardly inasmuch as the tension cable 22 is disposed through the plurality of bores 9, all of which are located offset or above the respective pivot pins 13 joining the plurality of segments 5 to one another. This pivotal and angular displacement will continue as the nut 28 is advanced along the threads 27 until such time as all of the juxtaposed segment edges 14 and 15 have abutted one another at which time the hook portion 3 will have assumed the rigid curved configuration shown in full lines of FIG. 1 of the drawing.

Following the above described manipulation the fishhook 1 will be seen to be ready for use and suitable bait (such as bloodworms) may be affixed thereto. On the other hand, if a larger type of bait is desired to be employed such as small whole fish then this bait may be more readily applied by stringing or threading the fishhook through same. In this case the fisherman has the alternative of utilizing the hook portion 3 in the longitudinally aligned position shown in broken lines in FIG. 1 which facilitates threading the non-curved hook portion 3 through the mouth and gullet of fish bait with the point 17 of the rigid barb element 4 acting as a needle to guide the articulated section through the belly of the fish bait after which, the lock means 28 is manipulated to apply tension to the cable 22 to form the rigid curved hook portion 3 and place the baited fishhook in condition for use.

Figure 4:
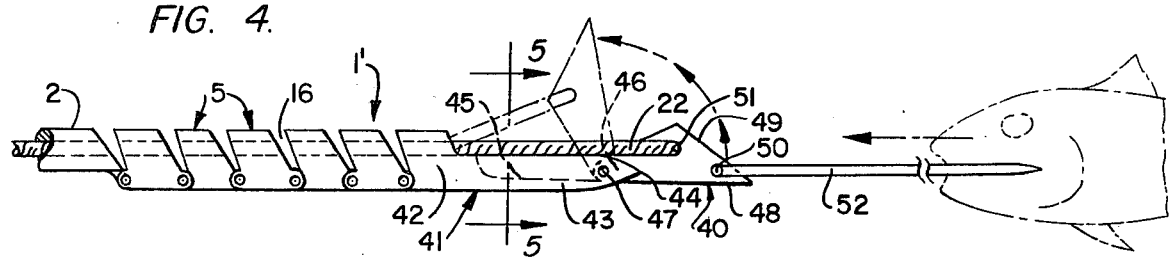
FIG. 4 is a partial side elevation of the hook portion of a further embodiment of the present invention and illustrates the alternate positions of a displaceable barb element carried by the forwardmost element of the hook portion.
Figure 6:
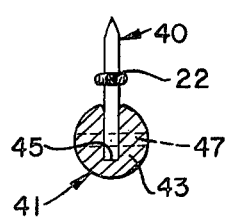
FIG. 6 is a side elevation of the structure of FIG. 4 as it appears when displaced to the use position upon the tightening of the tension cable.
Figure 5:
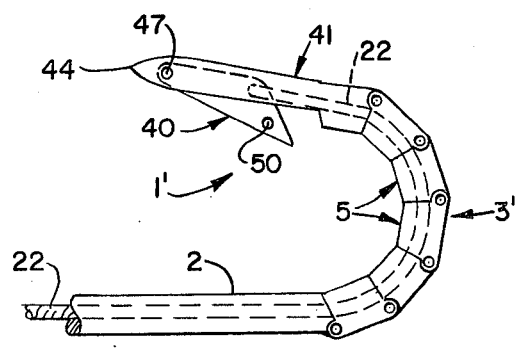
FIG. 5 is a transverse verticle sectional view taken along the line 5–5 of FIG. 4.

The embodiment illustrated in FIGS. 4–6 of the drawing is similar to the preceding embodiment insofar as it includes a rigid shank member 2 attached at its forward end to an articulated section comprising a plurality of pivotally connected segments 5. In this fishhook 1' a modified structure is provided in the area of the point and barb. Instead of a fixed barb element 4 being attached to the forwardmost elongated segment of the curved hook portion 3' a displaceable barb element 40 is carried by a modified forwardmost segment 41. This forwardmost segment 41 includes a base 42 having tail pivot sections 11 and main upper body 6 similar to that of the remaining segments 5 and will be seen to include a forwardly projecting nose 43 extending a substantial distance beyond the main upper body 6 of the segment 41 in a plane offset from the axis of the passageway or bore 9 yet parallel thereto and terminating in a point 44. The upper portion of this nose 43 adjacent an extension of the axis of the bore 9 includes a groove or channel 45 therein within which the base 46 of the barb element 40 is disposed and retained for pivotal displacement by means of a suitable transverse pivot pin 47. The triangular barb element 40 includes a shoulder 48 forming an acute angle with a barb undersurface 49 and a hole 50 is located in the barb element adjacent the vertex of the shoulder 48 and the undersurface 49 for purposes which will be explained hereinafter. A third hole 51 is provided in the barb element adjacent the opposite end of the barb undersurface 49 for receiving the free end of the flexible tension cable 22 and is situated so that when the barb element 40 is in its extended make-ready position as shown in full lines in FIG. 4 of the drawing the end of the cable 22 will be disposed no lower than an extension of the axis of the bore 9 of the axially aligned pivotal segments 5. Upon subsequent tightening or retraction of the tension cable 22 in a manner identical to that as described in the previous embodiment, the displaceable barb element 40 will be retracted or angularly displaced in the direction of the arrows shown in FIG. 4 until nested in the channel or groove 45 at which point continued retraction of the tension cable 22 will cause the upward and rearward displacement of the plurality of segments 5 until all of the juxtaposed edges 14 and 15 of the segments are abutting one another at which time the fishhook 1' will appear in the ready or use position such as shown in FIG. 6 of the drawing.

The purpose of the displaceable barb element 40 is twofold. After landing a catch employing the fishhook 1' it will be appreciated that in addition to being able to loosen or extend the tension cable 22 in order to relax the rigid curved portion 3' to facilitate retraction of the fish hook from the catch it will follow that the barb element 40 will also be released from its fixed use position to thereby further facilitate complete removal of the fishhook 1' from the catch. Furthermore, when it is desired to utilize small fish as bait in connection with the fishhook 1', the forwardly displaced barb element 40 may be combined with a suitable bait threading member such as a resilient or rigid needle 52 which may be removeably attached to the barb element 40 by means of its hole 50 whereupon after threading the member 52 through the fish bait until at least the barb element 40 emerges therefrom, the threading member 52 is then removed from its attachment within the hole 50 and the tension cable 22 thereafter actuated to retract same to position fishhook 1' into the ready or use condition as previously described.

From the foregoing it will be seen that an improved fishhook is provided which is capable of being selectively manipulated to alter the configuration of its hook portion by the displacement of the plurality of segments 5. It will now be appreciated that by forming the segment edges 14 and 15 at an angular disposition as shown in FIGS. 2 and 4, these edges will then be in full juxtaposed contact when the segments are displaced to the use position of FIGS. 1 and 6.

I claim:

1. A fishhook comprising, an elongated shank joined to a hook portion, said hook portion including a plurality of elongated segments having head and tail pivot sections, means pivotally connecting adjacent said sections of adjacent said segments to provide an articulated hook portion, said segments when extended substantially axially aligned with said shank defining a space between adjacent said segments, said segments including an axially extending bore therethrough and a cable disposed through said segment bores and affixed adjacent the forwardmost one of said segments and adjustable lock means engageable with said cable and shank to maintain said cable in a retracted position whereby, retraction of said cable displaces said segments upwardly and rearwardly from an axially aligned position to a curved position as said space between said segments is reduced until said segments abut one another at which point a rigid curved hook portion is achieved.

2. A fishhook according to claim 1 wherein, said shank is substantially rigid and includes an axial bore, and said cable extends from said segment bores into said shank bore.

3. A fishhook according to claim 1 including, a barb element fixedly attached to said forwardmost segment.

4. A fishhook according to claim 1 including, a barb element pivotally attached to said forwardmost segment.

5. A fishhook according to claim 1 wherein, said segments include a main upper body having said bore therethrough and said pivot sections depend below the plane of said segment bores.

6. A fishhook according to claim 1 wherein, said segment main upper bodies are provided with front and rear edges defining said spaces between adjacent segments when axially aligned, said front and rear edges angularly disposed to one another whereby, when said segments are axially aligned said spaces define an acute angle.

7. A fishhook according to claim 2 wherein, said lock means includes a threaded rod extending from the free end of said shank and a nut carried by said rod abutting the free end of said shank whereby, manipulation of said nut along said rod controls displacement of said cable and hook portion.

8. A fishhook according to claim 5 wherein, said forwardmost segment includes a nose terminating in a point and said barb element is pivotally attached to said nose rearwardly of said point.

9. A fishhook according to claim 5 wherein, said cable is attached at its forwardmost end to said pivotally attached barb element.

* * * * *